(12) United States Patent
Fujino et al.

(10) Patent No.: US 8,244,302 B2
(45) Date of Patent: Aug. 14, 2012

(54) RADIO BASE STATION DEVICE

(75) Inventors: Tomoko Fujino, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/003,141

(22) PCT Filed: Nov. 27, 2008

(86) PCT No.: PCT/JP2008/003501
§ 371 (c)(1),
(2), (4) Date: Jan. 7, 2011

(87) PCT Pub. No.: WO2010/061423
PCT Pub. Date: Jun. 3, 2010

(65) Prior Publication Data
US 2011/0111803 A1    May 12, 2011

(51) Int. Cl.
*H04B 1/38*   (2006.01)
*H04M 3/00*   (2006.01)

(52) U.S. Cl. ........................................ 455/558; 455/418

(58) Field of Classification Search ................ 455/575.1, 455/557, 575.4, 556.1, 575.5, 333, 420, 558, 455/67.15, 226.2, 573, 343.1, 412.1, 413; 361/799, 679.31
See application file for complete search history.

(56) References Cited

U.S. PATENT DOCUMENTS 5,526,235 A *  6/1996  Beason et al. ................ 361/799
5,959,834 A *  9/1999  Chang ..................... 361/679.31

FOREIGN PATENT DOCUMENTS

| JP | 2004 234487 | 8/2004 |
| JP | 2006 67628 | 3/2006 |
| JP | 2007 165939 | 6/2007 |
| JP | 2008 263490 | 10/2008 |

OTHER PUBLICATIONS

International Search Report issued Feb. 24, 2009 in PCT/JP08/003501 filed Nov. 27, 2008.

\* cited by examiner

*Primary Examiner* — Kiet Doan
(74) *Attorney, Agent, or Firm* — Oblon, Spivak, McClelland, Maier & Neustadt, L.L.P.

(57) ABSTRACT

A radio base station device 1 includes a card insertion portion 3 into which a USIM card 2 is inserted, and a cover 4 slidably disposed for covering the card insertion portion 3. In a power on state in which a power supply adapter 6 is connected to an adapter connecting unit 5, the power supply adapter 6 restricts the sliding movement of the cover 4, and therefore the card insertion portion 3 cannot be exposed and the USIM card 2 cannot be extracted and inserted from and into the radio base station device. In a power off state in which the power supply adapter 6 is detached, the card insertion portion 3 can be exposed by sliding the cover 4, and therefore the USIM card 2 can be extracted and inserted from and into the radio base station device.

6 Claims, 5 Drawing Sheets

RADIO BASE STATION DEVICE

FIELD OF THE INVENTION

The present invention relates to a radio base station device having a USIM (Universal Subscriber Identity Module) card mounted therein.

BACKGROUND OF THE INVENTION

Conventionally, a USIM card is mounted in a mobile telephone terminal. This USIM card needs to be extracted and inserted from and into the mobile telephone terminal in a state in which the mobile telephone terminal is turned off in order to prevent the same subscriber information from being registered into a plurality of mobile telephone terminals.

A mechanism of mounting a USIM card in a mobile telephone terminal is proposed by patent reference 1. In this mobile telephone terminal, a recessed battery pack mounting portion for mounting a battery pack is disposed in the back of the mobile telephone terminal, which is opposite to a surface on which keys are arranged, and a card insertion opening is formed in a perpendicular wall adjacent to this battery pack mounting portion. The USIM card is made to slide and is inserted, via the card insertion opening, in a direction perpendicular to the perpendicular wall, so that the USIM card is mounted in the mobile telephone terminal. Because the card insertion opening is formed in such a way as to be hidden by the battery pack when the battery pack is mounted in the battery pack mounting portion, the USIM card mounted in the mobile telephone terminal cannot be extracted from the mobile telephone terminal unless the battery pack mounted is detached from the battery pack mounting portion.
Patent reference 1: JP, 2006-67628,A Because the conventional USIM card mounting mechanism is constructed as above, the USIM card mounted in the mobile telephone terminal cannot be easily detached from the mobile telephone terminal. However, the reference does not describe particularly any mechanism of mounting a USIM card in a radio base station device.

Conventionally, no USIM card is mounted in a radio base station device, though in a case in which a USIM card is mounted in the radio base station device, when the USIM card is detached from the radio base station device in a state in which the radio base station device is turned on, the radio base station device from which the USIM card is detached succeedingly operates with the subscriber information of the USIM card. A problem is therefore that when the detached USIM card is mounted in another radio base station device in this state, there occurs an illegal state in which two or more radio base station devices which operate with the same subscriber information exist.

On the other hand, in order to prevent such an illegal state from occurring even if the USIM card is extracted and inserted from and into the radio base station device while the radio base station device is in the state in which the radio base station device is turned on, it is necessary to monitor the USIM card. A problem is, however, that monitoring the USIM card all the time causes an increase in the amount of information to be processed by software and an increase in the power consumption of the radio base station device.

The present invention is made in order to solve the above-mentioned problems, and it is therefore an object of the present invention to provide a radio base station device that implements a structure of enabling a USIM card to be extracted and inserted therefrom and thereinto only when the radio base station device is turned off in order to prevent an illegal state from occurring without increasing the amount of information to be processed by software and the power consumption thereof.

DISCLOSURE OF THE INVENTION

In accordance with the present invention, there is provided a radio base station device including: a data card in which subscriber identification information is stored; a card insertion portion into which the data card is inserted; a cover slidably mounted to the radio base station device, for covering the card insertion portion; and a power supply switching unit disposed in a direction in which the cover slides, for enabling power to be supplied to the radio base station device when the power supply switching unit is placed at a position at which the power supply switching unit is projecting from a surface of the radio base station device, and for disabling the power to be supplied to the radio base station device when the power supply switching unit is placed at a position at which the power supply switching unit is not projecting from the surface, in which in a power on state, the power supply switching unit placed at the position at which the power supply switching unit is projecting from the surface restricts the sliding movement of the cover to disable the data card to be extracted and inserted from and into the radio base station device.

In the radio base station device in accordance with the present invention, the power supply switching unit restricts the sliding movement of the cover in the power on state of the radio base station device. Therefore, the radio base station device can implement the structure of enabling the USIM card to be extracted and inserted therefrom and thereinto only in the power off state thereof.

In accordance with the present invention, there is provided a radio base station device including: a data card in which subscriber identification information is stored; a card insertion portion into which the data card is inserted; and a slide switch for enabling power to be supplied to the radio base station device when the slide switch is placed at a position at which the slide switch covers the card insertion portion, and for disabling the power to be supplied to the radio base station device when the slide switch is made to slide to a position at which the card insertion portion is exposed.

The radio base station device in accordance with the present invention is provided with the slide switch for disabling the power supply when the slide switch is placed at the position at which the card insertion portion is exposed. Therefore, the radio base station device can implement the structure of enabling the USIM card to be extracted and inserted therefrom and thereinto only in the power off state thereof.

In accordance with the present invention, there is provided a radio base station device including a data card in which subscriber identification information is stored; a card insertion portion into which the data card is inserted; and an electric power switch disposed in a bottom surface of the card insertion portion opposite to an opening of the card insertion portion, for enabling power to be supplied to the radio base station device when the electric power switch is placed at a position at which the electric power switch is accommodated below the bottom surface, and for disabling the power to be supplied to the radio base station device when the electric power switch is placed at a position at which the electric power switch is projecting from the bottom surface, in which the data card inserted into the card insertion portion pushes down the electric power switch in the bottom surface to enable the power to be supplied to the radio base station device, and, when the data card is extracted from the card insertion portion, the electric power switch is moved to the position at which the electric power switch is projecting from the bottom surface to disable the power to be supplied to the radio base station device.

In the radio base station device in accordance with the present invention, when the data card is extracted from the radio base station device, the electric power switch is placed at the position at which the electric power switch is projecting from the bottom surface to disable the power supply. Therefore, the radio base station device can implement the structure of enabling the USIM card to be extracted and inserted therefrom and thereinto only in the power off state thereof.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
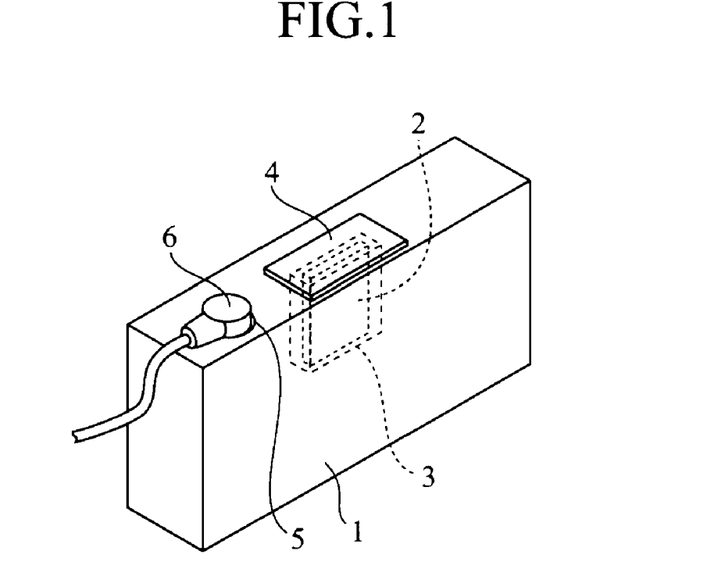
FIG. 1 is a perspective view showing the structure of a radio base station device in accordance with Embodiment 1 of the present invention when the radio base station device is placed in a power on state.
Figure 2:
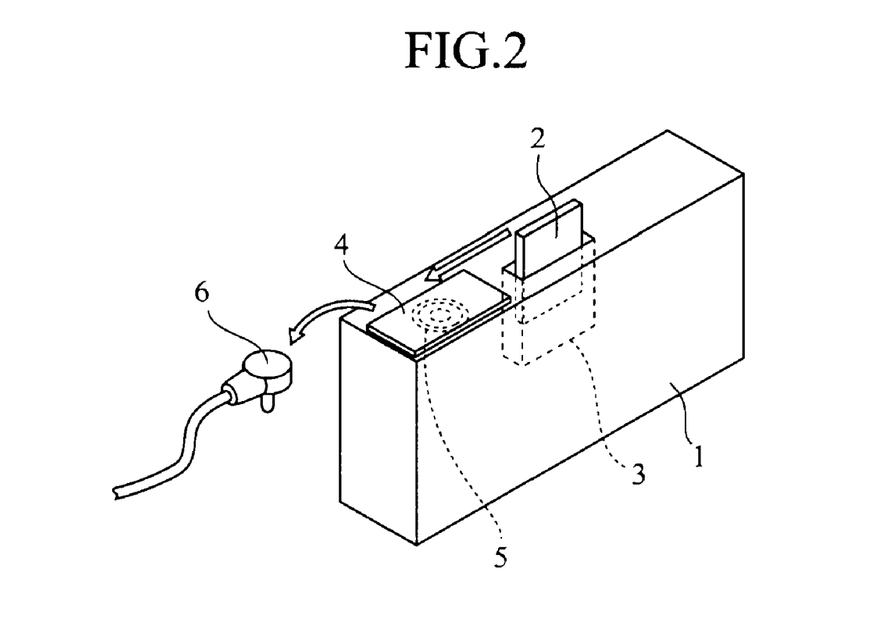
FIG. 2 is a perspective view showing the structure of the radio base station device in accordance with Embodiment 1 of the present invention when the radio base station device is placed in a power off state.

FIGS. 1 and 2 are perspective views showing the structure of a radio base station device 1 in accordance with Embodiment 1 of the present invention, FIG. 1 shows a power on state of the radio base station device and FIG. 2 shows a power off state of the radio base station device. The radio base station device 1 is provided with a card insertion portion 3 into which a USIM card 2 is inserted, the card insertion portion 3 serving as an interface for furnishing subscriber information stored in the USIM card to the radio base station device 1, a sliding-type cover 4 for covering the card insertion portion 3, an adapter connecting unit 5 that serves as an interface for turning on and off the power to the radio base station device 1, and a power supply adapter 6 connected to the adapter connecting unit 5, for supplying the power to the radio base station device. A power supply switching unit is comprised of the adapter connecting unit 5 and the power supply adapter 6.

The subscriber information which is required when the radio base station device 1 carries out communications is recorded into the USIM card 2. When the USIM card 2 is inserted into the card insertion portion 3 of the radio base station device 1, the radio base station device 1 acquires and registers the subscriber information recorded into the USIM card 2 thereinto.

The card insertion portion 3 is disposed adjacent to the adapter connecting unit 5, and has an opening which is covered by the cover 4. This cover 4 can be constructed in such a way as to slide only in a direction toward the adapter connecting unit 5. When the power supply adapter 6 is connected to the adapter connecting unit 5, the power supply adapter 6 restricts the sliding movement of the cover 4. As a result, the cover 4 cannot be moved in the direction toward the adapter connecting unit 5 from the card insertion portion 3 when the power supply adapter 6 is connected to the adapter connecting unit 5. Therefore, in order to extract and insert the USIM card 2 from and into the radio base station device, a power off operation of removing the power supply adapter 6 from the adapter connecting unit 5 to turn off the radio base station device 1 is required.

In FIG. 1, when the power supply adapter 6 is connected to the adapter connecting unit 5 of the radio base station device 1, the power is supplied to the radio base station device 1 and the radio base station device is placed in the power on state. Because the power supply adapter 6 restricts the sliding movement of the cover 4 when the radio base station device is placed in the power on state, the card insertion portion 3 cannot be exposed. Therefore, when the radio base station device is placed in the power on state, the USIM card 2 cannot be extracted from the radio base station device.

In FIG. 2, when the power supply adapter 6 is removed from the adapter connecting unit 5 of the radio base station device 1, no power is supplied to the radio base station device 1 and the radio base station device is placed in the power off state. When the radio base station device is placed in the power off state, the card insertion portion 3 can be exposed by sliding the cover 4 onto an upper face of the adapter connecting unit 5. Therefore, when the radio base station device is placed in the power off state, the USIM card 2 can be extracted and inserted from and into the radio base station device.

According to above-mentioned Embodiment 1, when the radio base station device is placed in the power on state, the card insertion portion 3 is covered by the cover 4 and the USIM card 2 cannot be extracted and inserted from and into the radio base station device because the power supply adapter 6 placed at a position at which it is projecting from the surface of the radio base station device restricts the sliding movement of the cover 4, whereas when the radio base station device is placed in the power off state, the power supply adapter 6 is detached and the sliding movement of the cover 4 becomes possible, and, when the card insertion portion 3 is exposed by the sliding movement of the cover 4, the USIM card 2 can be extracted and inserted from and into the radio base station device.

Thus, the radio base station device can be constructed in such a way that the USIM card 2 cannot be extracted and inserted from and into the radio base station device in the state in which the radio base station device 1 is turned on. As a result, the radio base station device can be prevented from entering an illegal state in which the same subscriber identification information is registered into a plurality of radio base station devices. Furthermore, because it is not necessary to monitor the USIM card continuously through software processing, the amount of information to be processed by software, and the power consumption of the radio base station device can be reduced.

Embodiment 2

Figure 3:
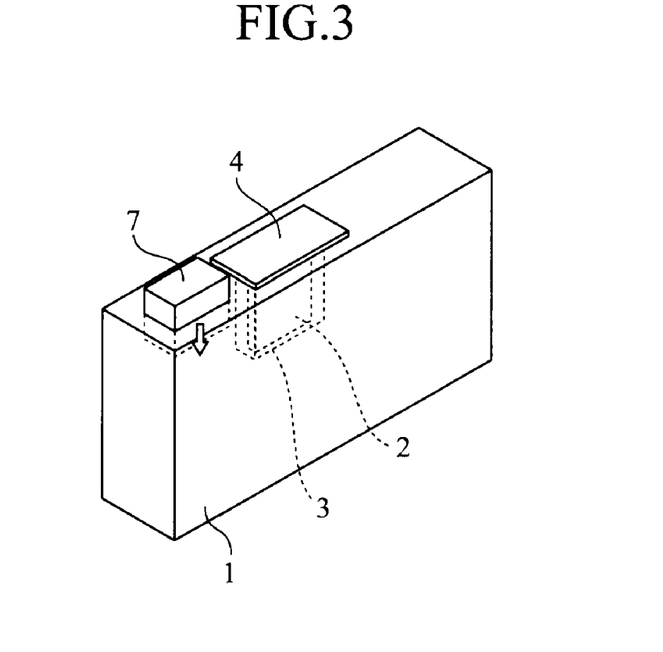
FIG. 3 is a perspective view showing the structure of a radio base station device in accordance with Embodiment 2 of the present invention when the radio base station device is placed in a power on state.
Figure 4:
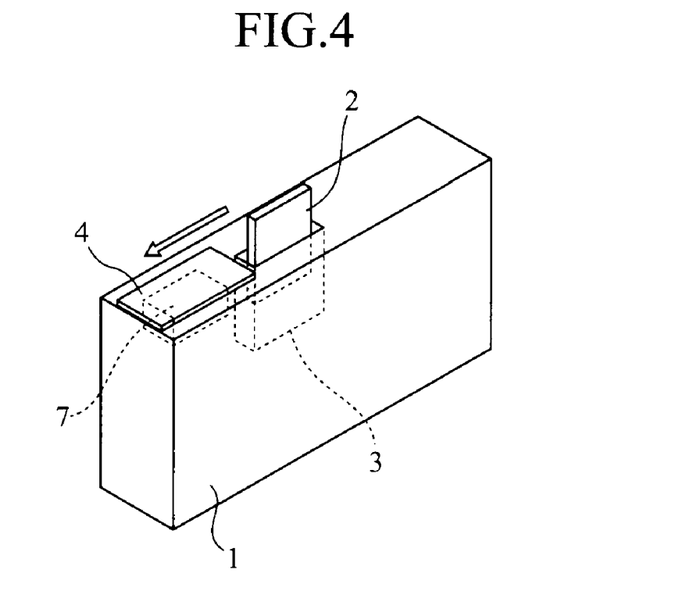
FIG. 4 is a perspective view showing the structure of the radio base station device in accordance with Embodiment 2 of the present invention when the radio base station device is placed in a power off state.

FIGS. 3 and 4 are perspective views showing the structure of a radio base station device 1 in accordance with Embodiment 2 of the present invention, FIG. 3 shows a power on state of the radio base station device and FIG. 4 shows a power off state of the radio base station device. In FIGS. 3 and 4, the same components as those shown in FIGS. 1 and 2 and like components are designated by the same reference numerals as those shown in the figures respectively, and the explanation of the components will be omitted hereafter. The radio base station device 1 in accordance with this embodiment is provided with a push-button switch (a power supply switching unit) 7 that serves as an interface for turning on and off the radio base station device. This push-button switch 7 is constructed in such a way as to control the supply of the power to the radio base station device 1 from a not-shown power supply adapter or the like, and, when the push-button switch is placed at a position at which it is projecting from a surface of the radio base station device 1, that is, when the push-button switch is placed in a projecting state, enables the power to be supplied to the radio base station device 1. Furthermore, when the push-button switch 7 is placed at a position at which it is not projecting from the surface of the radio base station device 1, the push-button switch disables the power to be supplied to the radio base station device 1.

A card insertion portion 3 is disposed adjacent to the push-button switch 7, and a cover 4 is constructed in such a way as to slide only in a direction toward the push-button switch 7. The push-button switch 7 is made to project from the surface of the radio base station device 1 to restrict the sliding movement of the cover 4 when the radio base station device is turned on. Therefore, when the push-button switch 7 is placed in the projecting state, the cover 4 cannot be moved in the direction toward the push-button switch 7 from the card insertion portion 3. Therefore, in order to extract and insert the USIM card 2 from and into the radio base station device 1, a power off operation of pushing down the push-button switch 7 to turn off the radio base station device 1 is required.

In FIG. 3, when the push-button switch 7 of the radio base station device 1 is placed in the projecting state, the power is supplied to the radio base station device 1 and the radio base station device is placed in the power on state. Because the push-button switch 7 restricts the sliding movement of the cover 4 when the radio base station device is placed in the power on state, the card insertion portion 3 cannot be exposed and therefore the USIM card 2 cannot be extracted from the radio base station device.

In FIG. 4, when the push-button switch 7 of the radio base station device 1 is pushed down and is then moved to a position at which the push-button switch is not projecting from the surface of the radio base station device 1, no power is supplied to the radio base station device 1 and the radio base station device is placed in the power off state. When the radio base station device is placed in the power off state, the card insertion portion 3 can be exposed and therefore the USIM card 2 can be extracted and inserted from and into the radio base station device by sliding the cover 4 onto an upper face of the push-button switch 7.

According to above-mentioned Embodiment 2, when the radio base station device is placed in the power on state, the card insertion portion 3 is covered by the cover 4 and the USIM card 2 cannot be extracted and inserted from and into the radio base station device because the push-button switch 7 placed at the position at which it is projecting from the surface of the radio base station device restricts the sliding movement of the cover 4, whereas when the radio base station device is placed in the power off state, the push-button switch 7 is pushed down and the sliding movement of the cover 4 becomes possible, and, when the card insertion portion 3 is exposed by the sliding movement of the cover 4, the USIM card 2 can be extracted and inserted from and into the radio base station device.

Thus, the radio base station device can be constructed in such a way that the USIM card 2 cannot be extracted and inserted from and into the radio base station device in the state in which the radio base station device 1 is turned on. As a result, the radio base station device can be prevented from entering an illegal state in which the same subscriber identification information is registered into a plurality of radio base station devices. Furthermore, because it is not necessary to monitor the USIM card continuously through software processing, the amount of information to be processed by software, and the power consumption oldie radio base station device can be reduced.

Embodiment 3

Figure 5:
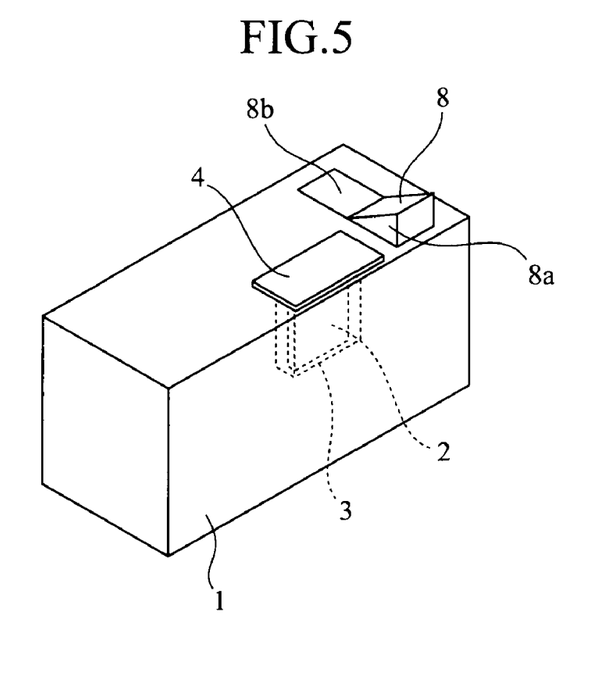
FIG. 5 is a perspective view showing the structure of a radio base station device in accordance with Embodiment 3 of the present invention when the radio base station device is placed in a power on state.
Figure 6:
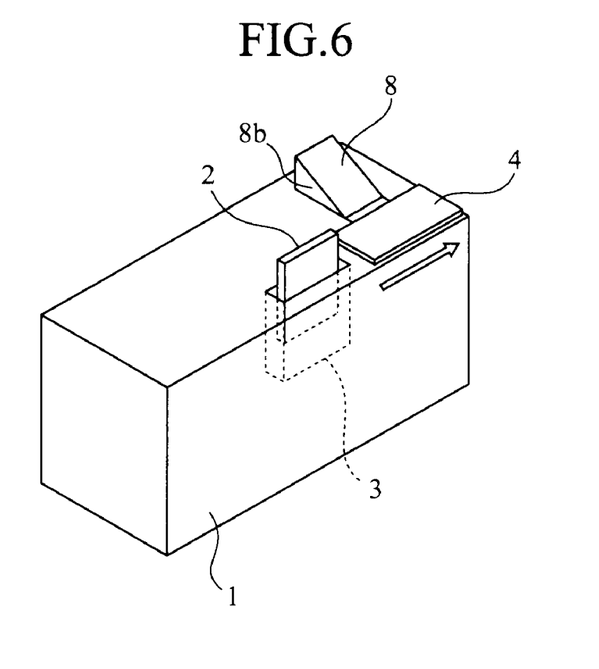
FIG. 6 is a perspective view showing the structure of the radio base station device in accordance with Embodiment 3 of the present invention when the radio base station device is placed in a power off state.

FIGS. 5 and 6 are perspective views showing the structure of a radio base station device 1 in accordance with Embodiment 3 of the present invention, FIG. 5 shows a power on state of the radio base station device and FIG. 6 shows a power off state of the radio base station device. In FIGS. 5 and 6, the same components as those shown in FIGS. 1 and 2 and like components are designated by the same reference numerals as those shown in the figures respectively, and the explanation of the components will be omitted hereafter. The radio base station device 1 of this embodiment is provided with a rocker switch (a power supply switching unit) 8 that serves as an interface for turning on and off the radio base station device. The rocker switch 8 is constructed in such a way that as an end of the rocker switch is raised, another end of the rocker switch is lowered in synchronization with the raise, and enables the power to be supplied to the radio base station device 1 when the first end 8a is raised and the second end 8b is lowered, whereas the rocker switch disables the power to be supplied to the radio base station device 1 when the first end 8a is lowered and the second end 8b is raised.

A card insertion portion 3 is disposed adjacent to the rocker switch 8, and a cover 4 is constructed in such a way as to slide only in a direction toward the first end 8a of the rocker switch 8. The first end 8a of the rocker switch 8 projects from a surface of the radio base station device 1 to restrict the sliding movement of the cover 4 when the radio base station device is turned on. Therefore, when the first end 8a of the rocker switch 8 is placed in the state in which the first end is raised, the cover 4 cannot be moved in the direction toward the rocker switch 8 from the card insertion portion 3. Therefore, in order to extract and insert the USIM card 2 from and into the radio base station device 1, a power off operation of pushing down the first end 8a to turn off the radio base station device 1 is required.

In FIGS. 5 and 6, the example in which the rocker switch 8 is disposed in such a way that the direction of the length of the rocker switch 8 is perpendicular to the sliding direction of the cover 4 and the first end 8a is placed at a position in the sliding direction of the cover 4 is shown, though this embodiment is not limited to this example. For example, the rocker switch 8 can be aligned along the sliding direction of the cover in such a way that the direction of the length of the rocker switch 8 is parallel to the sliding direction.

In the FIG. 5, when the second end 8b of the rocker switch 8 is pushed down and lowered and the first end 8a is placed in the state in which it is projecting from the surface of the radio base station device 1 in synchronization with the lowering of the second end, the power is supplied to the radio base station device 1 and the radio base station device is placed in the power on state. Because the first end 8a of the rocker switch 8 restricts the sliding movement of the cover 4 when the radio base station device is placed in the power on state, the card insertion portion 3 cannot be exposed and therefore the USIM card 2 cannot be extracted from the radio base station device.

In FIG. 6, when the first end 8a of the rocker switch 8 is pushed down and is then moved to a position at which the first end 8a is not projecting from the surface of the radio base station device 1, no power is supplied to the radio base station device 1 and the radio base station device is placed in the power off state. When the radio base station device is placed in the power off state, the card insertion portion 3 can be exposed and therefore the USIM card 2 can be extracted and inserted from and into the radio base station device by sliding the cover 4 onto an upper face of the first end 8a of the rocker switch 8.

According to above-mentioned Embodiment 3, when the radio base station device is placed in the power on state, the card insertion portion 3 is covered by the cover 4 and the USIM card 2 cannot be extracted and inserted from and into the radio base station device because the first end 8a of the rocker switch 8 which is raised up to the position at which it is projecting from the surface of the radio base station device restricts the sliding movement of the cover 4, whereas when the radio base station device is placed in the power off state, the first end 8a of the rocker switch 8 is lowered to the position at which it is not projecting from the surface and the sliding movement of the cover 4 becomes possible, and, when the card insertion portion 3 is exposed by the sliding movement of the cover 4, the USIM card 2 can be extracted and inserted from and into the radio base station device.

Thus, the radio base station device can be constructed in such a way that the USIM card 2 cannot be extracted and inserted from and into the radio base station device in the state in which the radio base station device 1 is turned on. As a result, the radio base station device can be prevented from entering an illegal state in which the same subscriber identification information is registered into a plurality of radio base station devices. Furthermore, because it is not necessary to monitor the USIM card continuously through software processing, the amount of information to be processed by software, and the power consumption of the radio base station device can be reduced.

Embodiment 4

Figure 7:
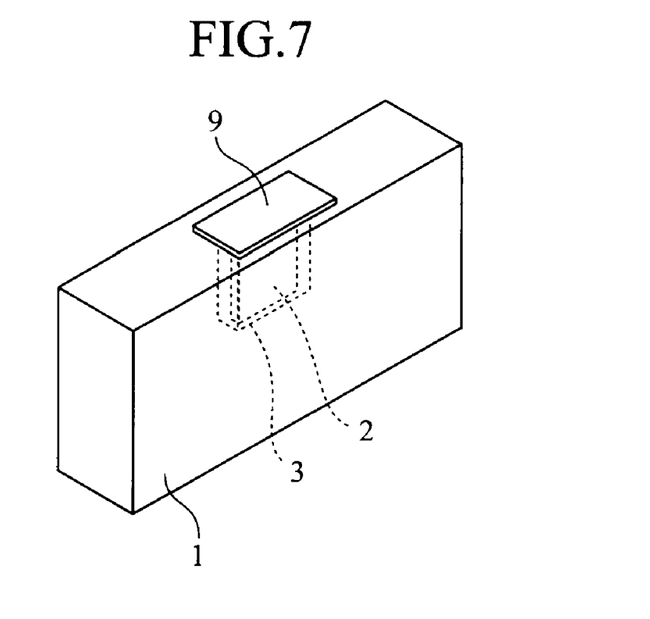
FIG. 7 is a perspective view showing the structure of a radio base station device in accordance with Embodiment 4 of the present invention when the radio base station device is placed in a power on state.
Figure 8:
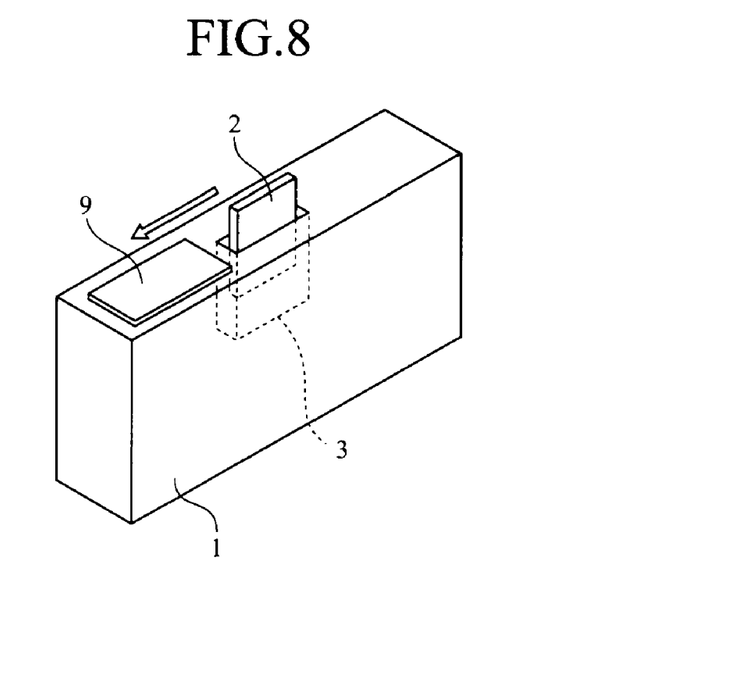
FIG. 8 is a perspective view showing the structure of the radio base station device in accordance with Embodiment 4 of the present invention when the radio base station device is placed in a power off state.

FIGS. 7 and 8 are perspective views showing the structure of a radio base station device 1 in accordance with Embodiment 4 of the present invention, FIG. 7 shows a power on state of the radio base station device and FIG. 8 shows a power off state of the radio base station device. In FIGS. 7 and 8, the same components as those shown in FIGS. 1 and 2 and like components are designated by the same reference numerals as those shown in the figures respectively, and the explanation of the components will be omitted hereafter. The radio base station device 1 in accordance with this embodiment is provided with a slide switch 9 that serves as an interface for turning on and off the radio base station device. This slide switch 9 serves as a cover for covering a card insertion portion 3, and, when the slide switch is placed at a position at which the slide switch covers the card insertion portion 3, enables the power to be supplied to the radio base station device 1. In contrast, the slide switch 9 disables the power to be supplied to the radio base station device 1 when the slide switch is placed at a position at which the slide switch is made to slide and is placed to expose the card insertion portion 3.

In FIG. 7, when the slide switch 9 of the radio base station device 1 is moved to the position at which the slide switch covers the card insertion portion 3, the power is supplied to the radio base station device 1 and the radio base station device is placed in the power on state. Because the slide switch 9 covers the card insertion portion 3 when the radio base station device is placed in the power on state, the card insertion portion 3 cannot be exposed and therefore the USIM card 2 cannot be extracted from the radio base station device. Therefore, when the slide switch 9 is made to slide in order to extract and insert the USIM card 2 from and into the radio base station device, the radio base station device is automatically placed in the power off state.

In FIG. 8, when the slide switch 9 of the radio base station device 1 is made to slide toward the position at which the card insertion portion 3 is exposed, no power is supplied to the radio base station device 1 and the radio base station device is placed in the power off state. Because the card insertion portion 3 is exposed when the radio base station device is placed in the power off state, the USIM card 2 can be extracted and inserted from and into the radio base station device.

The slide switch 9 in accordance with above-mentioned Embodiment 4 is constructed in such a way as to enable the power to be supplied to the radio base station device 1 when the slide switch is placed at the position at which the slide switch covers the card insertion portion 3, and disable the power to be supplied to the radio base station device when the slide switch is made to slide to the position at which the card insertion portion 3 is exposed.

Thus, the radio base station device can be constructed in such a way that the USIM card 2 cannot be extracted and inserted from and into the radio base station device in the state in which the radio base station device 1 is turned on. As a result, the radio base station device can be prevented from entering an illegal state in which the same subscriber identification information is registered into a plurality of radio base station devices. Furthermore, because it is not necessary to monitor the USIM card continuously through software processing, the amount of information to be processed by software, and the power consumption of the radio base station device can be reduced.

Embodiment 5

Figure 9:
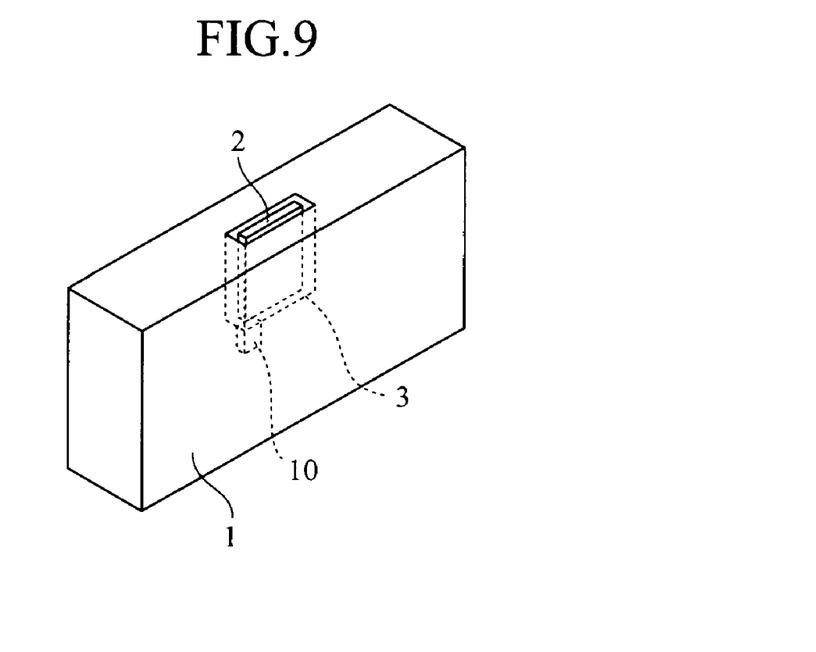
FIG. 9 is a perspective view showing the structure of a radio base station device in accordance with Embodiment 5 of the present invention when the radio base station device is placed in a power on state.
Figure 10:
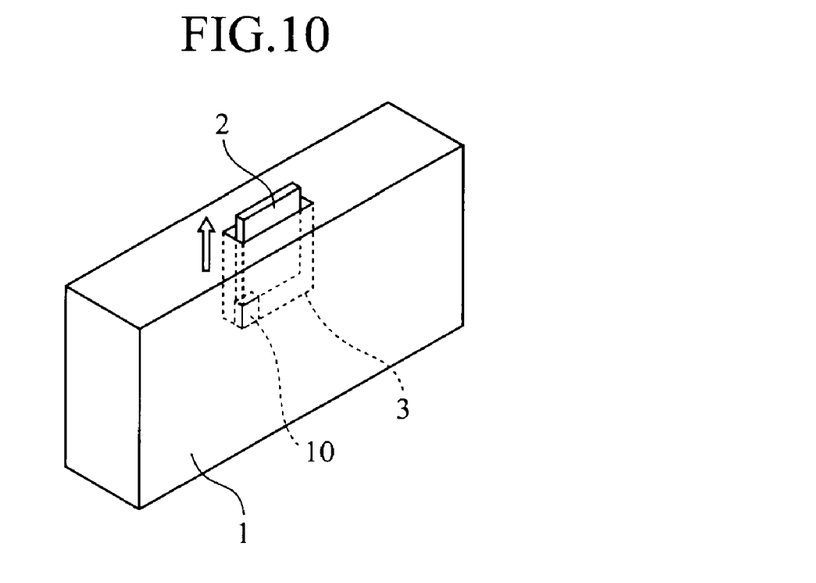
FIG. 10 is a perspective view showing the structure of the radio base station device in accordance with Embodiment 5 of the present invention when the radio base station device is placed in a power off state.

FIGS. 9 and 10 are perspective views showing the structure of a radio base station device 1 in accordance with Embodiment 5 of the present invention, FIG. 9 shows a power on state of the radio base station device and FIG. 10 shows a power off state of the radio base station device. In FIGS. 9 and 10, the same components as those shown in FIGS. 1 and 2 and like components are designated by the same reference numerals as those shown in the figures respectively, and the explanation of the components will be omitted hereafter. The radio base station device 1 of this embodiment is provided with an electric power switch 10 that serves as an interface for turning on and off the radio base station device. This electric power switch 10 is disposed in a bottom portion of a card insertion portion 3, and, when the electric power switch is accommodated in the bottom portion and placed at a position where the electric power switch is not projecting from the bottom surface of the card insertion portion, enables the power to be supplied to the radio base station device 1. Furthermore, when the electric power switch 10 is placed at a position which the electric power switch is projecting from the bottom surface of the card insertion portion 3, that is, in a projecting state, disables the power to be supplied to the radio base station device 1.

In FIG. 9, because the USIM card 2 pushes down the electric power switch 10 disposed in the bottom portion of the card insertion portion 3 to accommodate the electric power switch in the bottom portion when the USIM card 2 is inserted into the card insertion portion 3 of the radio base station device 1, the radio base station device 1 is placed in the power on state. While the USIM card 2 is inserted into the card insertion portion 3, the USIM card 2 holds the electric power switch 10 at the position at which the electric power switch is not projecting from the bottom surface of the card insertion portion 3, and therefore the radio base station device is continuously placed in the power on state.

In the FIG. 10, because the holding of the electric power switch 10 by the USIM card 2 is released when the USIM card 2 is extracted from the card insertion portion 3 of the radio base station device 1, the electric power switch 10 is placed in the projecting state and therefore the radio base station device 1 is placed in the power off state. As a result, because the electric power switch 10 is placed in the projecting state after the USIM card 2 is extracted from the card insertion portion 3, the radio base station device 1 is placed automatically in the power off state.

The radio base station device in accordance with above-mentioned Embodiment 5 is constructed in such away that when the USIM card 2 inserted into the card insertion portion 3 pushes down the electric power switch 10 disposed in the bottom portion of the card insertion portion 3, the power is supplied to the radio base station device 1, and, when the USIM card 2 is extracted from the card insertion portion 3, the electric power switch 10 is returned to the position at which the supply of the power is disabled and is placed in the projecting state.

Thus, the radio base station device can be constructed in such a way that the USIM card 2 cannot be extracted and inserted from and into the radio base station device in the state in which the radio base station device 1 is turned on. As a result, the radio base station device can be prevented from entering an illegal state in which the same subscriber identification information is registered into a plurality of radio base station devices. Furthermore, because it is not necessary to monitor the USIM card continuously through software processing, the amount of information to be processed by software, and the power consumption of the radio base station device can be reduced.

Industrial Applicability

As mentioned above, because the radio base station device in accordance with the present invention is constructed in such a way as to enable the power supply switching unit to restrict the sliding movement of the cover in the power on state, and enable the USIM card to be extracted and inserted therefrom and thereinto only in the power off state, the radio base station device in accordance with the present invention is suitable for use as a radio communications base station device or the like in a mobile communications system, in which a USIM card is mounted.

The invention claimed is:

1. A radio base station device having a data card in which subscriber identification information is stored, and a card insertion portion into which said data card is inserted, for carrying out radio communications by using the subscriber identification information read from said data card, wherein said radio base station device comprises:
 a cover slidably mounted to said radio base station device, for covering said card insertion portion; and
 a power supply switching unit disposed in a direction in which said cover slides, for enabling power to be supplied to said radio base station device when the power supply switching unit is placed at a position at which said power supply switching unit is projecting from a surface of the radio base station device, and for disabling the power to be supplied to said radio base station device when the power supply switching unit is placed at a position at which the power supply switching unit is not projecting from the surface, wherein in a power on state, said power supply switching unit placed at the position at which said power supply switching unit is projecting from the surface restricts the sliding movement of said cover to disable said data card to be extracted and inserted from and into said radio base station device.

2. The radio base station device according to claim 1, wherein the power supply switching unit includes an adapter connecting unit disposed in the direction in which the cover slides, and a power supply adapter connected to said adapter connecting unit, for supplying the power to said radio base station device.

3. The radio base station device according to claim 1, wherein the power supply switching unit is a push-button switch disposed in the direction in which the cover slides, for enabling the power to be supplied to said radio base station device when the push-button switch is placed at a position at which the push-button switch is projecting from the surface, and for disabling the power to be supplied to said radio base station device when the push-button switch is placed at a position at which the push-button switch is not projecting from the surface.

4. The radio base station device according to claim 1, wherein the power supply switching unit is a rocker switch having an end which is made to raise and another end which is made to lower in synchronization with the raise of said end, and disposed in such a way that said end is placed in the direction in which the cover slides, for enabling the power to be supplied to said radio base station device when said end of said rocker switch is raised up to a position at which said end of said rocker switch is projecting from the surface, and for disabling the power to be supplied to said radio base station device when said end of said rocker switch is lowered to a position at which said end of said rocker switch is not projecting from the surface.

5. A radio base station device having a data card in which subscriber identification information is stored, and a card insertion portion into which said data card is inserted, for carrying out radio communications by using the subscriber identification information read from said data card, wherein said radio base station device comprises: a cover slidably mounted to said radio base station device, for covering said card insertion portion, said cover slidably movable between a first position completely covering said card insertion portion and blocking access to said card insertion portion and a second position exposing said card insertion portion, said cover comprising a slide switch for enabling power to be supplied to said radio base station device when said cover is placed at a said first position at which said cover completely covers and blocks access to said card insertion portion, and for disabling the power to be supplied to said radio base station device when said cover is at said second position at which said card insertion portion is exposed.

6. A radio base station device having a data card in which subscriber identification information is stored, and a card insertion portion into which said data card is inserted, for carrying out radio communications by using the subscriber identification information read from said data card, wherein said radio base station device comprises: an electric power switch disposed in a bottom surface of said card insertion portion opposite to an opening of said card insertion portion, for enabling power to be supplied to said radio base station device when said electric power switch is placed at a position at which said electric power switch is accommodated below the bottom surface, and for disabling the power to be supplied to said radio base station device when said electric power switch is placed at a position at which said electric power switch is projecting from the bottom surface, wherein said data card inserted into said card insertion portion pushes down said electric power switch in said bottom surface to enable the power to be supplied to said radio base station device, and, when said data card is extracted from said card insertion portion, said electric power switch is moved to the position at which said electric power switch is projecting from said bottom surface to disable the power to be supplied to said radio base station device.

\* \* \* \* \*